Patented Oct. 27, 1931

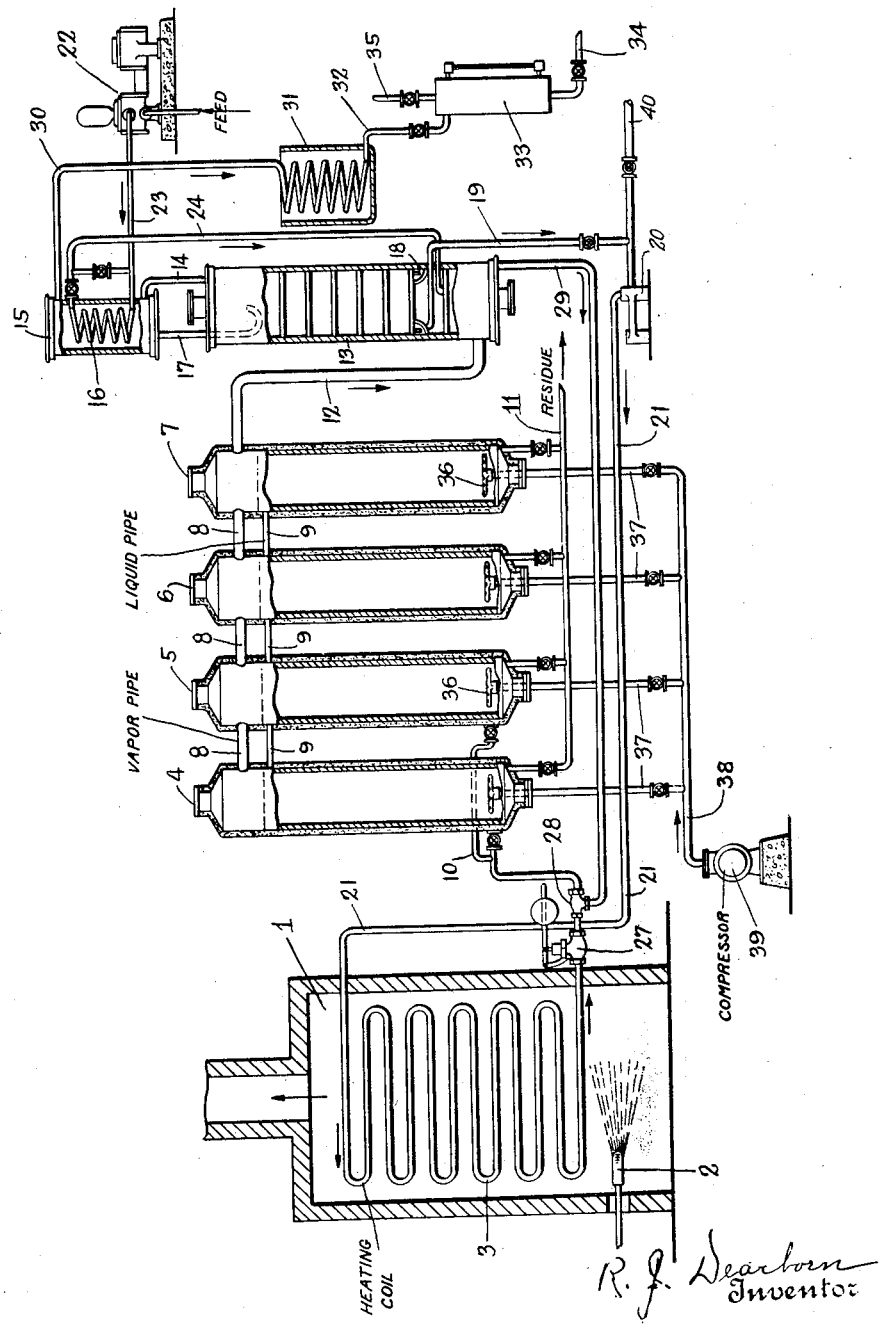

1,828,998

UNITED STATES PATENT OFFICE

RICHARD J. DEARBORN, OF SUMMIT, NEW JERSEY, ASSIGNOR, BY MESNE ASSIGNMENTS, TO THE TEXAS COMPANY, OF NEW YORK, N. Y., A CORPORATION OF DELAWARE

PROCESS FOR DECOMPOSING ORGANIC MATERIALS

Application filed April 22, 1926. Serial No. 103,794.

This invention relates to a method for decomposing organic substances, preferably in a liquid or semi-liquid state, or in a state of colloidal solution or suspension in a reactive liquid medium, by the application of heat and pressure, and with the aid of an oxidizing gas, preferably air. The invention also contemplates the introduction of air into the body of the liquid medium, preferably in such limited and regulated quantities as to effect the splitting or oxidation or decomposition of the organic substance in a predetermined manner, such splitting or oxidation or decomposition being accomplished preferably without excess of air but, on the contrary, with an excess of the organic material.

The invention is adapted to the treatment of numerous organic substances such as oils, bitumens, tars and pitches, but it is particularly suited to the treatment of hydrocarbons, notably those included in, or derived from mineral oils, crude petroleum, shale oil, mineral waxes, etc. A further adaptation of my invention comprises the treatment of colloidal solutions, or physical suspensions of solid organic material, such as coal, lignite, or peat, preferably in a finely divided condition, in any of the aforementioned liquid substances.

In the operation of this invention a substantial portion of the resultant products may consist of motor fuel of high volatility and especially suitable for use in internal combustion engines, but the process also enables the production of varying proportions of oxygen containing compounds such as alcohols, aldehydes, ketones, fatty acids, phenoloid bodies and solvents. The proportion of these substances may be varied, depending upon the pressure, temperature, quantity of air and other controllable factors. The products of the decomposition may further be classified as water soluble and water insoluble; the water soluble portion includes such bodies as alcohols, ketones and the like, and the water insoluble portion includes the aforementioned fraction which is especially suitable as motor fuel. Depending upon the character of materials desired or the type of organic substance which is being decomposed, the quantity of air or other controlling factors may be varied.

An outstanding characteristic of the invention consists in the slow oxidation of a portion of the organic substance being treated whereby heat is generated which may be utilized in any measure desired to maintain the temperatures necessary to effect decomposition. In the usual course the oil or liquid medium may be preliminarily heated to such a temperature that the oxygen of the air which may be introduced will readily combine with some of the organic material to generate additional heat. The process may thereafter be conducted merely by maintaining pressure and introducing such a quantity of air as to furnish sufficient heat by oxidation to maintain conditions favorable to decomposition. The process may thus be operated continuously, liquid being added to the reaction chamber to maintain the desired level, while the residuum material or tar may be withdrawn at stated intervals, or continuously. If it is desired the air may be preheated to any suitable degree, with or without preheating of the liquid material.

My invention further contemplates continuously heating all or a portion of the charge to such temperature that a smaller quantity of air will be required to maintain conditions requisite to decomposition; such quantity of air may constitute only a small fraction of that which would be required if the process were to be operated solely by the heat produced by the exothermic reaction.

In the operation of the usual pyrogenic cracking processes great quantities of gases are generated and evolved, consisting largely of the lower members of the paraffin, olefine and diolefine series of hydrocarbons which constitute the so-called permanent gases, inasmuch as they remain in gaseous form under atmospheric conditions of temperature and pressure. Consequently, these gases are unsuitable for marketing as liquid fuel and special provisions are required to effect their purification and disposal, the customary procedure being to use them as industrial fuel in the refinery. In the generation of these gases, however, there is consumed a considerable quantity of the raw material which is being subjected to decomposition and this action therefore constitutes a costly but necessary part of the cracking operation.

As heretofore pointed out, my process enables the production of controllable quantities of oxygen containing compounds suitable alike for motor fuel, solvents, chemical synthesis, etc. and having valuable properties of commercial aspects and therefore readily marketable at substantial prices in the trade. This process in which the material undergoing decomposition is subjected to oxidation, may be distinguished from the commonly known processes of pyrogenic decomposition, cracking or destructive distillation by the fact that the vapors contain considerably less of fixed or permanent gaseous hydrocarbons, or these vapors may be entirely free from such hydrocarbons. To readily designate a process of this character, therefore, we desire to employ the term oxygenic decomposition, signifying disintegration or decomposition of the organic materials into relatively low boiling liquids in the presence of an oxidizing substance, preferably compressed air.

The process may produce, by one method of operation, vapors containing practically no fixed or permanent gaseous hydrocarbons. Another manner of operation may result in the evolution of only limited amounts of such hydrocarbons, which amounts, however, may be less than those customarily produced in processes of pyrogenic decomposition or cracking.

One satisfactory method of operation may be to crack the liquid which is to be decomposed while maintained entirely in the liquid phase, under high pressure and at high temperature, then reducing both the pressure and temperature and introducing the liquid into a converting vessel where distillation and further decomposition may be effected by introducing regulated quantities of an oxidizing gas, such as compressed air, or compressed air and steam. By such a method of operation the quantity of fixed or permanent hydrocarbon gases may be considerably reduced if not eliminated altogether, while the residual material which has not been decomposed sufficiently to volatilize under the conditions maintained in the converting vessel may undergo splitting, decomposition, or oxidation in the presence of the oxidizing gas to produce additional quantities of low boiling oils.

It is further proposed as a modification of the operations described in the foregoing paragraph, to fractionally remove from the vapors evolved from the converting vessel in suitable apparatus, those constituents whose boiling points are too high to serve as motor fuel and to separately collect such condensate and subject it to liquid phase cracking under high pressure and temperature; this cracked condensate may then be passed into the converting vessel under reduced pressure and temperature to undergo distillation and further decomposition. In such operation the fresh charge may be passed either in direct contact or in heat exchange relationship with the vapors evolved from the converting vessel and the charge may then preferably be employed to aid in reducing the temperature of the hot cracked condensate, the mixed liquids then to be passed into the converting vessel to undergo conversion therein to light materials by oxygenic decomposition. The fresh charge may, in this instance, consist of relatively high boiling point material which will readily undergo decomposition under the conditions maintained in the converting vessel, while the condensate may be of lower boiling point and more stable material, of the nature of light gas oil or kerosene, and which may appropriately be subjected to the preliminary high temperature and high pressure liquid phase cracking prior to being introduced into the converting vessel to undergo distillation and further reaction. If the fresh charge be passed into direct contact with the hot vapors, it may desirably consist of crude petroleum, or the like, which has not previously been subjected to distillation for the removal of the lower boiling constituents, including those suitable for motor fuel, in order that these constituents may be volatilized by the heat of the vapors and thus be removed from the crude oil. Such treatment may simultaneously effect a partial cooling of the vapors and condensation of the heaviest constituents thereof.

The conditions to which the reacting materials are subjected, both in the preliminary cracking apparatus, preferably a heating coil, and in the converting vessel, may be subject to considerable variations depending largely upon the materials which are being treated. For the purpose of illustration, and without limiting effect therefore, it may be stated that the temperature of the heating coil may be from 800° to 1000° F., or even higher, but preferably about 900° F; the pressures may suitably be between 800 to 1000 pounds per square inch. As previously stated, the temperature and pressure is reduced before the material is passed into the converting vessel and the temperatures there may suitably be between 600° and 800° F. while the pressure may range from 300 to 600 pounds per square inch. Under such pressures and temperatures it will be found that the oxygen of the air will readily react with the materials in the converting vessel, and since it is usually desirable to introduce the air near the bottom of the vessel, substantially complete deoxygenation may be effected in its passage through the liquid material.

The apparatus suited to the operation of my process may be similar in many respects to that commonly used to accomplish cracking by destructive distillation methods. It may comprise a converting vessel or still, preferably of the vertical type and provided with an air nozzle or distributor near the bottom for the introduction of compressed air, compressed air and steam, or other oxidizing gas.

Provision may be made for introducing the fresh oil, or liquid mixture, at a point preferably near the bottom of the vessel while the vapors generated may be taken off near the top and passed into the usual type of dephlegmator or bubble tower for the fractional removal of the heavier constituents. The vapors may pass from the bubble tower into a reflux condenser for further removal and fractionation of the vapor constituents and, if the fuel to be derived from the remaining vapors is to serve largely as motor fuel for internal combustion engines, this fractionation may be so conducted as to effect the removal of all heavier constituents of the vapors which may not be suitable for such fuel. Artificial cooling may be resorted to in the reflux condenser either by the circulation of cool oil, cool water or other agency therethrough. The condensate flowing to the base of the reflux condenser may be returned to the top of the bubble tower to serve as a cooling and fractionating medium therein. The condensate collecting at the bottom of the bubble tower, as heretofore pointed out, is preferably subjected to liquid phase cracking prior to being reintroduced into the converting vessel, and for this purpose a heating coil or other apparatus may be provided in which the necessary heat may be applied to effect cracking while a suitable pump may serve to raise the pressure of the condensate from that obtaining in the bubble tower. Provision may also be made for withdrawing residual liquid from the bottom of the vessel.

My invention also contemplates the use of several converting vessels in series preferably having means for inter-communication between them so that a common level of liquid material will prevail in the several vessels and the vapors may be taken off in a common conduit and introduced into a single bubble tower. In case several converting vessels are employed the cracked condensate is preferably introduced into the first or into the first and second vessels and residual liquid or tar withdrawn from the last or the last and next to the last vessels.

The accompanying drawing is a diagrammatic elevation partially in section of apparatus which may suitably be used in the operation of my process.

Referring to the drawing the furnace 1 is provided with an oil or gas burner 2, and is adapted to heat the coil 3, which is of comparatively small cross-section and through which the liquid material may be passed to be cracked in liquid phase into lower boiling liquid. The converting vessels 4, 5, 6 and 7 are arranged in series and provided with pipes 8 connecting the vapor spaces of the successive vessels. These vessels are also provided with pipes 9 to connect them at a common liquid level. The coil 3 is connected to the vessels 4 and 5 by the pipe 10 and liquid may be directed into these vessels by the manipulation of suitable valves. The vessels may be provided with draw-off pipes at or near the bottom, controlled by suitable valves leading into the pipe 11. Insulation is preferably provided for the vessels and connecting parts, to avoid substantial heat losses and enable more effective operation.

From the last vessel 7 a vapor conduit or pipe 12 leads to a point near the bottom of the dephlegmator 13 which is provided with suitable plates or trays for the fractionation of the incoming vapors. Vapors leaving the top of the dephlegmator 13 pass through the pipe 14 into a reflux condenser, shown diagrammatically at 15, in which cooling may be effected by the fresh liquid charge by passage through the coil 16. Liquid condensed and flowing to the bottom of the reflux condenser 15 passes downwardly through the pipe 17 into the top of the dephlegmator 13. A collecting tray 18 may be provided near the bottom of the dephlegmator 13 for the collection of the condensate of the heavier vapors and this liquid may be drawn off through the pipe 19 and raised to a high pressure by the pump 20, thus forcing the condensate through the pipe 21 into the heating coil 3 to effect liquid phase cracking therein. The fresh charge may be delivered by the pump 22 through pipe 23, coil 16 and pipe 24 to one of the lower trays of the dephlegmator 13 to serve as a condensing medium for some of the heavier vapors. Between the heating coil 3 and pipe 10 leading to the converting vessels 4 and 5, may be located a pressure regulating valve 27 for releasing a portion of the pressure on the cracked condensate. There may also be provided adjacent to the pressure regulating valve 27 a jet pump or injector 28 in which a considerable drop in pressure of the cracked condensate is effected, by means of which the fresh charge may be drawn from the bottom of the dephlegmator 13 through the pipe 29 to be mixed with the hot cracked condensate and effect cooling thereof prior to introducing the mixed liquids into the converting vessels. In place of utilizing the pressure maintained in the coil 3, for the operation of the jet pump 28 to draw in the fresh charge, it may be desirable to eliminate the jet pump altogether and introduce the fresh charge into pipe 10 by means of a suitable pump such as a surge pump. With this arrangement the pressure regulating valve 27 may be set at such a value as to effect the entire desired drop in pressure between the coil 3 and converting vessel 4. The fresh charge may then be mixed with the cracked condensate immediately after the reduction in pressure at a point corresponding roughly to the position of the jet pump 28 illustrated in the drawing.

A pipe 30 leads from the reflux condenser 15 to a water or brine cooled condenser shown diagrammatically at 31 and the condensate produced flows through pipe 32 into a receiver 33, while pipe 34 may lead to any suitable storage tank. Pipe 35 serves for the escape of uncondensed gases and may lead to any suitable container or apparatus for utilizing or purifying the same. Pipes 32 and 35 may be provided with suitable valves for the release of pressure obtaining in the system.

The pump 20 may be also be connected by a pipe 40 to any suitable source of charging stock, so that in the initial starting of the system oil may be drawn into the system through the pipe 40 by the closing of valve in pipe 19 and the opening of valve in pipe 40. When sufficient reflux becomes available, charging in this manner may be discontinued by closing the valve in pipe 40 and operation may thereafter be carried on with the valve in pipe 19 in an open position.

Each of the converting vessels 4, 5, 6 and 7 are provided with air distributors 36 by means of which compressed air or other suitable oxidizing gas may be introduced into the liquid, preferably in a finely divided condition. The distributors 36 are connected by pipes 37 and 38 to a compressor 39. Pipes 37 may be provided with regulating valves suitable for controlling the amount of compressed air entering each vessel.

While the apparatus shown may be operated in several ways to produce various results, the course of operation in general may be as follows:

The fresh charge may pass from the pump 22 through the pipe 23, coil 16, pipe 24 and into the lower section of the dephlegmator 13, where it may be distributed upon one or more of the trays and serve as a cooling and condensing medium for the removal of the heavier constituents of the vapors evolved from the stills. If the fresh charge be crude petroleum the heat of the vapors may also effect the vaporization of the most volatile constituents which may then pass on with the vapors. At the same time the fresh charge will be raised by the heat of the vapors to a comparatively high temperature and under the influence of the jet pump 28 will be drawn into the pipe 10 and introduced into either or both of the converting vessels 4 and 5. A common level of liquid will be maintained in all of the converting vessels because of the interconnections 9, while the desired liquid level may be maintained by withdrawal of residue through pipe 11. Air may be introduced in any desired quantity into each vessel through the distributors 36 and such temperatures created as to effect oxygenic decomposition of the contents. The vapors and gases generated pass through the interconnecting pipes 8 and finally through the pipe 12 into the dephlegmator 13 in which by fractionation the heavier constituents of the vapors are condensed and collect by gravity in the collecting tray 18. The vapors uncondensed in the dephlegmator 13 pass into the reflux condenser 15 and are there subjected to a further fractionation, the liquid condensed being returned to the top of the dephlegmator 13 through the pipe 17 to serve as a fractionating medium therein. Cooling may be effected in the reflux condenser 15 by the passage of the fresh charge through the coil 16.

The condensate collecting on the tray 18 is withdrawn by the pump 20 and forced under high pressure through the pipe 21 and into the heating coil 3, where the liquid is brought to sufficiently high temperature to effect pyrogenic decomposition. This decomposition is accomplished entirely in the liquid phase due to the high pressure maintained in coil 3. After sufficient cracking has occurred, the cracked condensate passes through the pressure regulating valve 27 and the hot cracked condensate is immediately mixed through means of the jet pump 28 with the relatively cool fresh charge, accompanied by a further reduction in pressure, and the mixed liquids are then introduced into the converting vessels.

The admission of fresh charge and the circulation of the condensate for further decomposition is preferably carried on in a continuous manner. It is desirable also to maintain a substantially constant liquid level in the converting vessels, in order to have uniform operating conditions, and for this reason residual liquid may be withdrawn preferably continuously to accomplish this end.

While I have thus described and illustrated my invention, various modifications thereof will be suggested to those skilled in the art, and I therefore desire to be limited only as indicated in the appended claims.

What I claim is:

1. The process of decomposing hydrocarbon materials in a substantially liquid state, which comprises heating the liquid to a high temperature of the order of 900° F. or over and under high pressure of the order of 800 pounds per square inch or over to effect pyrogenic decomposition thereof, reducing the pressure to about 300 to 600 pounds per square inch and lowering the temperature to not less than about 600° F. by mixing relatively cool fresh charge with the liquid, passing the mixed material into a heat insulated converting vessel, and introducing free oxygen containing gas into the liquid in the vessel, the said reduced temperature and pressure still being sufficiently high to promote the active reaction of the oxidizing gas with the liquid.

2. The process of decomposing hydrocarbon materials in a substantially liquid state, which comprises heating the liquid materials to a high temperature of the order of 900° F. or over and under high pressure of the order of 800 pounds per square inch or over to effect pyrogenic decomposition thereof, reducing the pressure to about 300 to 600 pounds per square inch and simultaneously lowering the temperature to not less than about 600° F. by mixing relatively cool fresh charge with the hot liquid, passing the mixture into a heat insulated converting vessel, introducing free oxygen containing gas into the liquid in the vessel, the said reduced temperature and pressure still being sufficiently high to promote the active reaction of the oxidizing gas with the liquid, and removing the generated vapors in heat exchange relationship to the fresh charge.

3. The process of decomposing hydrocarbon materials in a substantially liquid state, which comprises maintaining the liquid in a heat insulated converting vessel at a temperature of not less than about 600° F. and pressure of about 300 to 600 pounds per square inch suitable to active decomposition thereof by the introduction of a free oxygen containing gas, removing the generated vapors in heat exchange relationship with the fresh charge, condensing from the vapors the less volatile constituents, collecting the condensate and subjecting it in a coil of restricted cross-section to a high temperature of the order of 900° F. or over to effect liquid phase cracking thereof and under sufficient pressure to avoid vaporization of the liquid, reducing the pressure and lowering the temperature by mixing the relatively cool fresh charge with the cracked condensate, and passing the mixed material into the converting vessel to undergo further decomposition therein.

4. The process of decomposing hydrocarbon materials in a substantially liquid state, which comprises maintaining the liquid in a series of interconnected heat insulated converting vessels at a temperature of not less than about 600° F. and pressure of about 300 to 600 pounds per square inch suitable to active decomposition thereof, introducing a free oxygen containing gas into each vessel to react exothermically with the liquid therein, removing the generated vapors and condensing therefrom the less volatile constituents, collecting the condensate and raising it to a high temperature of the order of 900° F. or over and pressure of the order of 800 pounds per square inch or over to effect liquid phase cracking thereof, reducing the pressure and temperature of the cracked condensate to substantially that temperature and pressure obtaining in the converting vessels, and passing the cracked condensate into the first converting vessel to undergo further decomposition.

5. The process of decomposing hydrocarbon materials in a substantially liquid state, which comprises maintaining the liquid in a series of interconnected heat insulated converting vessels at a temperature of not less than about 600° F., and pressure of about 300 to 600 pounds per square inch suitable to active decomposition thereof by the introduction of a free oxygen containing gas, introducing such gas into each vessel to react exothermically with the liquid therein, removing the generated vapors in heat exchange relationship with the fresh charge, condensing from the vapors the less volatile constituents, collecting the condensate and subjecting it in a coil of restricted cross-section to a high temperature of the order of 900° F. or over to effect liquid phase cracking thereof and under sufficient pressure to avoid vaporization of the liquid, reducing the pressure and lowering the temperature by mixing the relatively cool fresh charge with the cracked condensate, and passing the mixed material into the first converting vessel to undergo further decomposition.

6. In a process of producing motor fuel from hydrocarbon materials in a substantially liquid state, the steps which comprise subjecting a liquid, which is relatively difficut to decompose into lower boiling liquid, to high temperature of the order of 900° F. or over and pressure of the order of 800 pounds per square inch or over to effect cracking thereof, reducing the pressure to about 300 to 600 pounds per square inch and lowering the temperature to not less than about 600° F. by mixing a readily decomposable hydrocarbon liquid with the cracked liquid, and passing the mixed liquids into a heat insulated converting vessel to undergo further decomposition in the presence of a free oxygen containing gas.

7. In a process of producing motor fuel from hydrocarbon materials in a substantially liquid state, the steps which comprise effecting liquid phase cracking of a liquid, which is relatively difficult to decompose into lower boiling liquid, at high temperature of the order of 900° F. or over and under sufficient pressure to avoid vaporization thereof, reducing the pressure from about 300 to 600 pounds per square inch and lowering the temperature to not less than about 600° F. by mixing a readily decomposable hydrocarbon liquid with a cracked liquid, passing the mixed liquids into a heat insulated converting vessel, and effecting distillation and further decomposition of the liquids by the admission of regulated quantities of a free oxygen containing gas.

8. The process of decomposing hydrocarbon materials in a substantially liquid state, which comprises maintaining the liquid in a heat insulated converting vessel at a temperature of not less than about 600° F. and pressure of about 300 to 600 pounds per square inch suitable to active decomposition thereof by the introduction of a free oxygen containing gas, removing the generated vapors in direct counter-current contact with the fresh charge, thereafter condensing from the vapors the less volatile constituents unsuitable for motor fuel, collecting the condensate and subjecting it to the high temperature of the order of 900° F. or over and pressure of the order of 800 pounds per square inch or over to effect liquid phase cracking thereof, reducing the pressure and lowering the temperature by mixing the relatively cool fresh charge with the cracked condensate, and passing the mixed material into the converting vessel to undergo active decomposition in the presence of the oxidizing gas.

9. The process of decomposing hydrocarbon materials in a substantially liquid state, which comprises maintaining the liquid in a series of interconnected heat insulated converting vessels, effecting oxygenic decomposition of the liquid in each vessel, removing the generated vapors in heat exchange relationship with the fresh charge, condensing from the vapors the less volatile constituents, collecting the condensate and subjecting it in a coil of restricted cross-section to a high temperature of the order of 900° F. or over and at a pressure of the order of 800 pounds per square inch or over to effect pyrogenic decomposition thereof, reducing the pressure to about 300 to 600 pounds per square inch and lowering the temperature to not less than about 600° F. by mixing the relatively cool fresh charge with the cracked condensate, and passing the mixed material into the first of a series of converting vessels to undergo decomposition in the presence of an oxidizing gas.

10. In the process of producing motor fuel, the steps which comprise effecting pyrogenic decomposition of a liquid hydrocarbon oil relatively difficult to decompose at temperatures of the order of 900° F. or over and pressures of the order of 800 pounds per square inch or over, mixing the thus treated oil with a heavier oil relatively easy to decompose, and without intermediate loss of heat, effecting decomposition of the mixed oils in a liquid state in the presence of an oxidizing gas while still under a pressure of about 300 to 600 pounds per square inch and a temperature of not less than about 600° F.

In witness whereof, I have hereunto set my hand this 20th day of April, 1926.

R. J. DEARBORN.